United States Patent
Mirajkar et al.

(10) Patent No.: US 9,524,516 B2
(45) Date of Patent: Dec. 20, 2016

(54) DYNAMIC UNIT RESOURCE USAGE PRICE CALIBRATOR FOR A VIRTUAL DATA CENTER

(71) Applicant: VMWARE, INC., Palo Alto, CA (US)

(72) Inventors: Akshay Prabhakar Mirajkar, Bangalore (IN); Kumar Gaurav, Bangalore (IN); Hemanth Kumar Pannem, Bangalore (IN); Akhil Sadashiv Hingane, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 674 days.

(21) Appl. No.: 14/054,863

(22) Filed: Oct. 16, 2013

(65) Prior Publication Data

US 2015/0106245 A1  Apr. 16, 2015

(51) Int. Cl.
*G06Q 30/02* (2012.01)
*G06Q 40/00* (2012.01)

(52) U.S. Cl.
CPC .......... *G06Q 30/0283* (2013.01); *G06Q 40/12* (2013.12)

(58) Field of Classification Search
CPC .............................. G06Q 30/0283; G06Q 40/12
USPC .............................................. 235/378; 705/30
See application file for complete search history.

(56) References Cited

U.S. PATENT DOCUMENTS

| | | | | |
|---|---|---|---|---|
| 6,216,108 B1* | 4/2001 | LeVander | ........ | G06Q 10/06315 705/400 |
| 6,516,312 B1* | 2/2003 | Kraft | ................... | G06F 17/3061 707/610 |
| 8,396,807 B1* | 3/2013 | Yemini | .................. | G06Q 10/06 705/400 |
| 8,533,715 B2* | 9/2013 | DeLuca | .............. | G06F 9/45558 718/1 |
| 8,626,545 B2* | 1/2014 | Van Pelt | .......... | G06Q 10/06398 705/317 |
| 9,037,717 B2* | 5/2015 | Canturk | ................ | G06F 9/5011 709/226 |
| 2009/0164356 A1* | 6/2009 | Bakman | ................. | G06Q 30/02 705/34 |
| 2013/0050246 A1* | 2/2013 | Barry | ...................... | G06F 11/32 345/593 |

\* cited by examiner

*Primary Examiner* — Seung Lee

(57) ABSTRACT

Techniques for performing dynamic cost per unit resource usage in a virtual data center are described. In one example embodiment, an initial unit resource usage price is received for the virtual data center for a first cycle. Further, capital expenditure (CAPEX) and operating expenditure (OPEX) information of the virtual data center of the first cycle is obtained. Furthermore, a target return on investment (ROI) for the virtual data center for a second cycle is received. A unit resource usage price is then computed for the second cycle using the received initial unit resource usage price for the first cycle and the CAPEX and OPEX information of the first cycle. The unit resource usage price is then dynamically calibrated for the second cycle using the computed unit resource usage price and the target ROI.

24 Claims, 5 Drawing Sheets

DYNAMIC UNIT RESOURCE USAGE PRICE CALIBRATOR FOR A VIRTUAL DATA CENTER

BACKGROUND

A chargeback application may be used to account for operational costs involved in providing and maintaining an information technology (IT) infrastructure, including the cost for IT services and applications. Measuring resource utilization and calculating the corresponding IT operational cost enable a data center to account for IT resource utilized, bill for the IT services provided and meet target return on investments (ROIs).

In a non-virtualized environment, a physical server and the associated resources like applications running on the physical server can be easily mapped to a department using them and billing them for such resource utilizations. Also, costs associated with maintenance and licensing can be directly associated to a department, thereby enabling the data center to calculate the IT operational costs.

However, in a rapidly growing and changing IT infrastructure, such as a cloud infrastructure, there may be significant uncertainty of customer base, rapidly changing requirements, frequent changes in capital expenditure (CAPEX) and operating expenditure (OPEX). Further, there may be lack of visibility to future trending and risks and frequent and future purchases of capacity. In such an environment, accounting for IT resource utilization, achieving yearly targets and meeting target ROIs can be a significant challenge. Furthermore the task of determining IT operational costs in a virtualized environment, which typically includes multiple physical computing systems that each include a hypervisor, virtual machine (VM) monitor, or similar logic that is configured to manage concurrent execution of multiple virtual machines (VMs) that may be shared across different business entities, can be even more challenging.

As a result, accounting for IT resource utilization, achieving yearly targets and meeting target ROIs may be significantly difficult. The difficulty in accounting for the IT resource utilization gets further compounded when applications and services get shifted over time to different physical servers based on load and available infrastructure resources. Furthermore, computing unit resource usage in such an environment can be difficult and challenging.

DETAILED DESCRIPTION

Embodiments described herein provide enhanced computer-based and network-based methods, techniques, and systems for a dynamic unit resource usage price calibrator in a virtual data center. The dynamic unit resource usage price calibrator analyzes capacity and cost trending for estimation of actual costs incurred in each billing cycle to achieve a predictable and desired return on investment (ROI). Further, the dynamic resource usage price calibrator computes and calibrates the unit resource usage price for each billing cycle based on capacity and cost trending to achieve a desired ROI.

Example embodiments provide the dynamic unit resource usage price calibrator residing in a management server that performs at least some of the described techniques. In one embodiment, the dynamic unit resource usage price calibrator receives an initial unit resource usage price for the virtual data center for a first cycle. The dynamic unit resource usage price calibrator then obtains capital expenditure (CAPEX) and operating expenditure (OPEX) information of the virtual data center of the first cycle. The dynamic unit resource usage price calibrator then receives a target ROI for the virtual data center for a second cycle. The dynamic unit resource usage price calibrator then computes a unit resource usage price for the second cycle using the received initial unit resource usage price for the first cycle and the CAPEX and OPEX information of the first cycle. Finally, the dynamic unit resource usage price calibrator dynamically calibrates the unit resource usage price for the second cycle using the computed unit resource usage price and the target ROI.

System Overview and Examples of Operation

Figure 1:
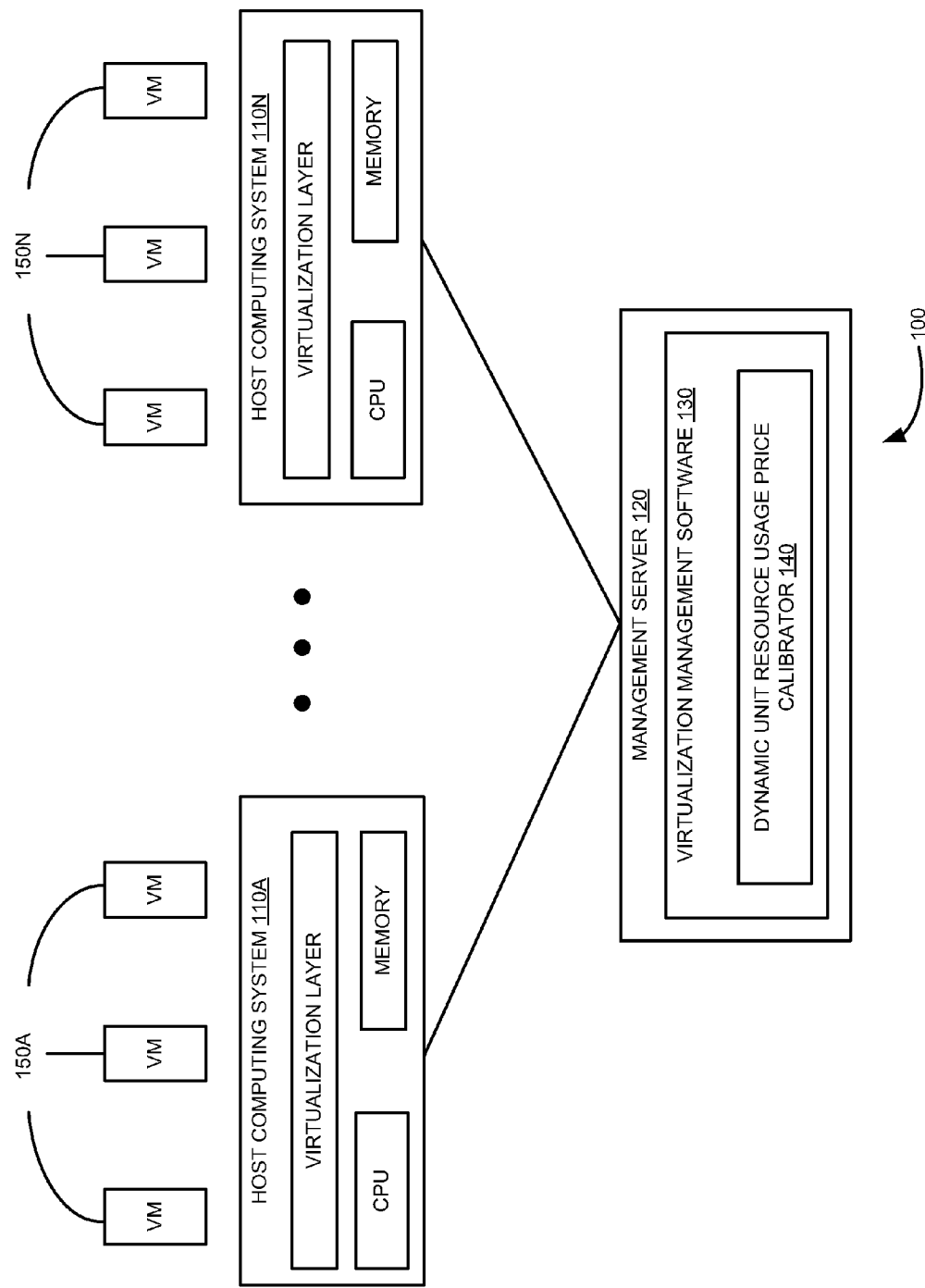
FIG. 1 is a block diagram illustrating a virtual data center including a dynamic unit resource usage price calibrator, according to an example embodiment.

FIG. 1 is a block diagram illustrating virtual data center 100 including dynamic unit resource usage price calibrator 140, according to an example embodiment. As shown in FIG. 1, virtual data center 100 includes host computing systems 110A-N and associated VMs 150 A-N hosted by host computing systems 110A-N. Also as shown in FIG. 1, virtualized data center 100 includes management server 120. Further as shown in FIG. 1, management server 120 includes virtualization management software (VMS) 130. Furthermore as shown in FIG. 1, VMS 130 includes dynamic unit resource usage price calibrator 140.

Figure 2:
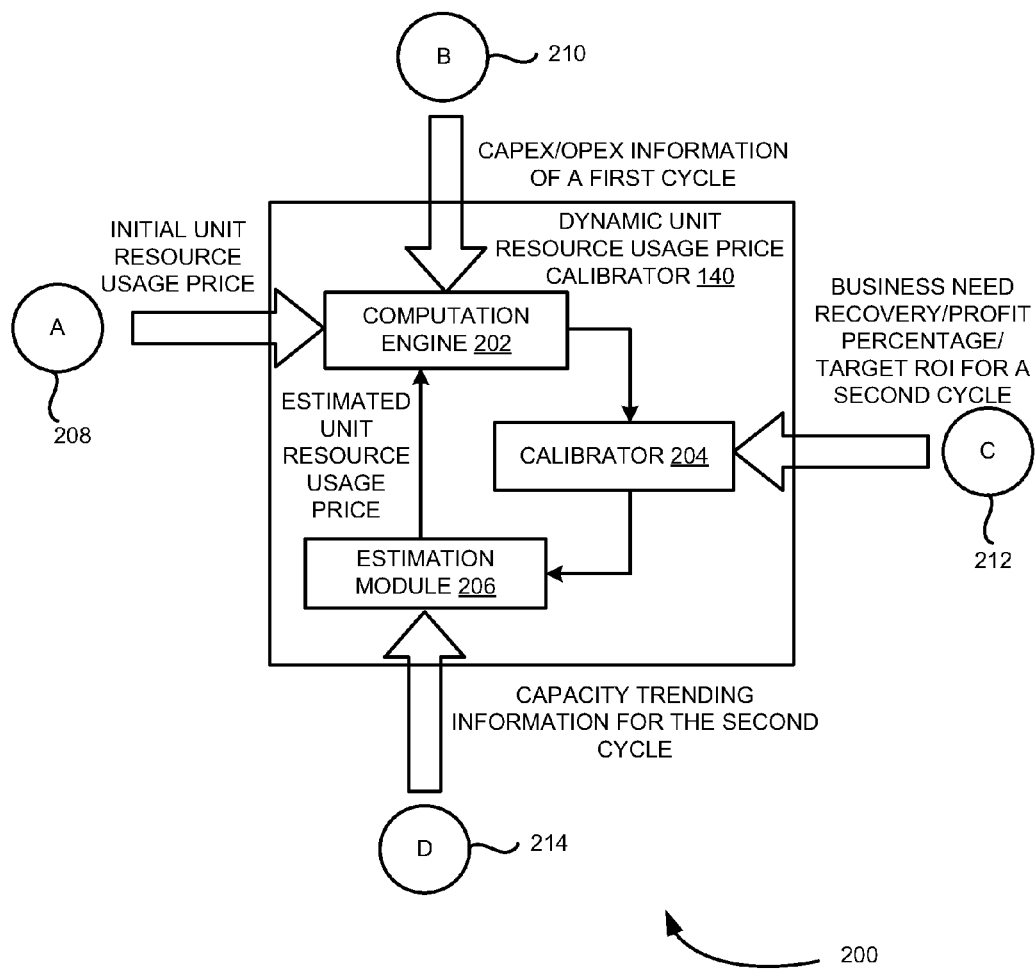
FIG. 2 is a block diagram illustrating the dynamic unit resource usage price calibrator including major modules and their interconnectivity, according to an example embodiment.

FIG. 2 is a block diagram 200 showing dynamic unit resource usage price calibrator 140 (shown in FIG. 1) including major modules and their interconnectivity, according to an example embodiment. As shown in FIG. 2, dynamic unit resource usage price calibrator 140 includes computation engine 202 that is configured to receive initial unit resource usage price 208 and CAPEX/OPEX information 210 for the first cycle. Also, as shown in FIG. 2, dynamic unit resource usage price calibrator 140 includes calibrator 204 that is communicatively coupled to computation engine 202 and configured to receive recovery information based on business needs, expected profitability, and/or target ROI 212. Further as shown in FIG. 2, dynamic unit resource usage price calibrator 140 includes estimation module 206 that is communicatively coupled between calibrator 204 and computation engine 202 and configured to receive a calibrated unit resource usage price of a second cycle and capacity trending information 214.

In operation, computation engine 202 receives initial unit resource usage price 208 for virtual data center 100 for the first cycle. In some embodiments, computation engine 202 is configured to receive initial unit resource usage price 208 from a cost data collector (not shown) residing in VMS 130. In some embodiments, the cost data collector can be configured to be a frontend dashboard to facilitate use by a service provider, such as a chief information officer (CIO) and/or an information technology (IT) admin. The cost data collector may be responsible for gathering cost data associated with existing capacity, infrastructure (e.g., cost per server) and so on. It can also be envisioned to receive this cost data manually from an IT admin. In some embodiments, initial unit resource usage price 208 may be received based on a type of depreciation rate used for resources in virtual data center 100 or historical unit resource usage price data. Exemplary resources are a random access memory (RAM), a central processing unit (CPU), a storage disk, a network and the like. Further in operation, computation engine 202 obtains CAPEX/OPEX information 210 incurred during the first cycle and computes a unit resource usage price for the second cycle. Exemplary unit resource usage price is a cost per VM usage per unit time in virtual data center 100. In some embodiments, computation engine 202 is configured to receive CAPEX/OPEX information 210 from the cost data collector residing in VMS 130.

Calibrator 204 then receives the computed unit resource usage price for the second cycle from computation engine 202 along with recovery information based on business needs, expected profitability, and/or target ROI 212. In some embodiments, calibrator 204 is configured to receive recovery information based on business needs, expected profitability, and/or target ROI 212 from a budget-ROI planner residing in VMS 130. The budget-ROI planner may be a dashboard in a panel in dynamic unit resource usage price calibrator 140, which can be configured to provide the analytical details of current and future state, such as whether to continue using the current pricing model, are there any risks to profitability, any near future anticipated drastic changes in usage patterns and/or any modifications need to current charging rates. Calibrator 204 then dynamically calibrates the computed unit resource usage price for the second cycle using the received computed unit resource usage price and recovery information based on business needs, expected profitability, and/or target ROI 212. In some embodiments, the target ROI may be received based on business needs, profitability and historical ROI.

Estimation module 206 then receives the dynamically calibrated unit resource usage price and capacity trending information 214 for the second cycle. In some embodiments, estimation module 206 may be configured to receive capacity trending information 214 from a capacity trending computation module residing in VMS 130. Estimation module 206 then estimates a unit resource usage price for the second cycle based on the received dynamically calibrated unit resource usage price and capacity trending information 214 for the second cycle.

The above operation repeats itself for a third cycle except for process performed by computation engine 202 that is configured to receive the estimated unit resource usage price for the second cycle instead of receiving the initial unit resource usage price when computing the unit resource usage price for the third cycle. It can be envisioned that the process repeats itself for the each of the subsequent cycles. Exemplary first cycle, second cycle, and third cycles are first billing cycle, second billing cycle, and third billing cycle, and first month, second month and third month and the like.

It can be seen that the above operation includes a feedback mechanism by way of a corrective loop for unit resource usage price which is iterative and repeats each cycle that takes into account predictions and estimates.

It can also be seen an IT admin can use the frontend dashboard to manually or automatically enter the CAPEX or OPEX information. Also, it can be seen that the IT admin may use the budget-ROI planner for inputting capacity purchase plans and associated weights in terms of highly-possible-purchase, might-purchase and the like. Further, the IT admin can input profitability, target ROI, budget plans for IT expenditure and so on.

Figure 3:
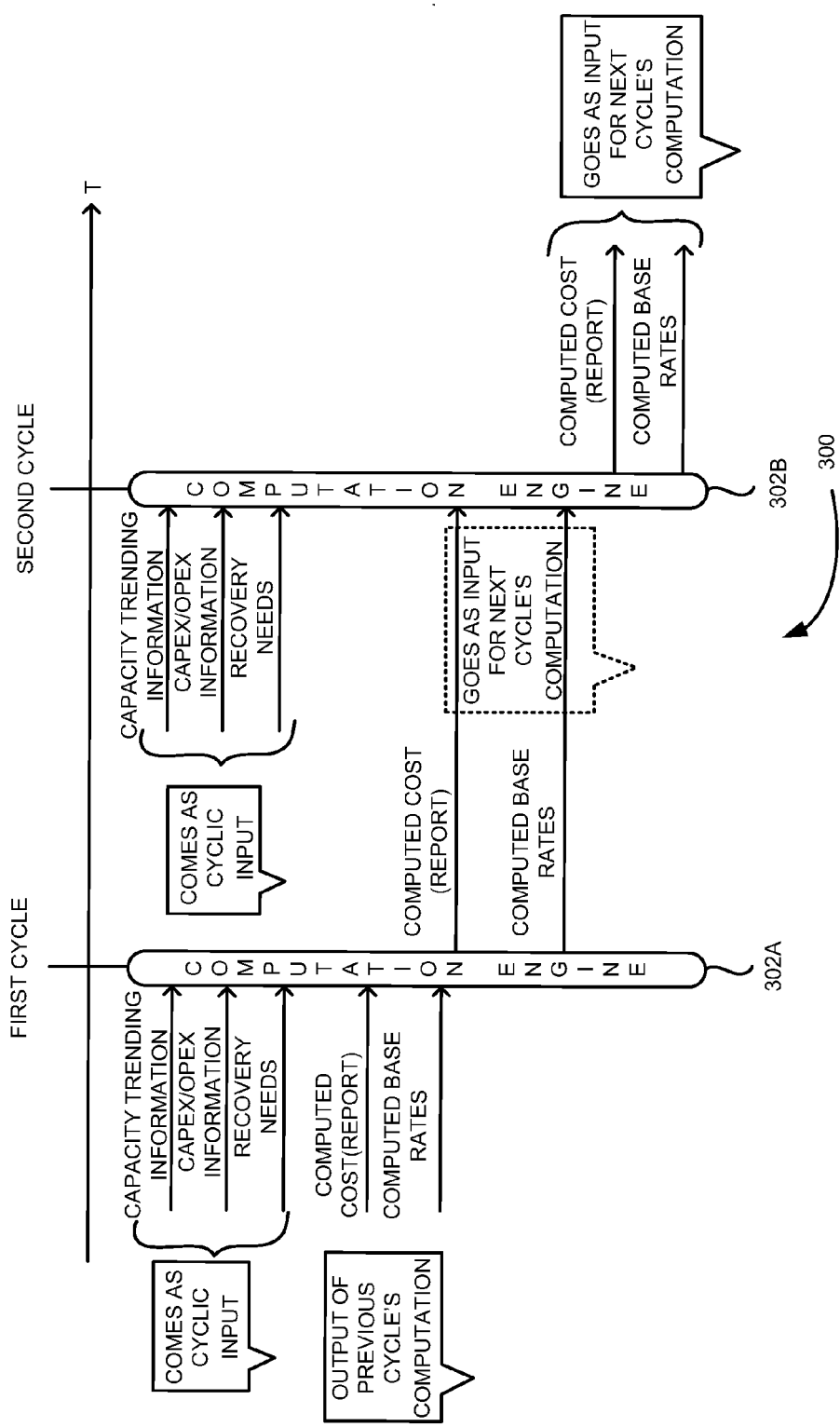
FIG. 3 is a timing diagram illustrating various data inputs to modules in the dynamic unit resource usage price calibrator, such as shown in FIGS. 1 and 2, and computed unit resource usage prices by the dynamic unit resource usage price calibrator over first and second billing cycles, according to an example embodiment.

FIG. 3 is a timing diagram 300 that illustrates various data inputs to modules in a dynamic cost per unit usage calibrator (e.g., dynamic unit resource usage price calibrator 140 shown in FIGS. 1 and 2), such as computation engines 302A and 302B (e.g., computation engine 202 shown in FIG. 2) and computed cost per unit by the dynamic cost per unit usage resource usage calibrator over first and second billing cycles, according to an example embodiment.

Also, although certain terms are used primarily herein, other terms could be used interchangeably to yield equivalent embodiments and examples. For example, the term "physical computing system" may be used interchangeably with "physical machine" or "physical device". Further for example, it is well-known that equivalent terms in the field of system virtualization or similar or related fields could be substituted for such terms as "physical computer," "hypervisor," "virtual machine," or the like. The terms "CPU" and "processor" are used interchangeably throughout the document. The term "memory" refers to "physical memory". The term "unit resource usage price" refers to cost per unit of virtual data center resource usage per unit time.

Numerous specific details are set forth herein, such as data formats and code sequences, and the like, in order to provide a thorough understanding of the described techniques. The embodiments described also can be practiced without some of the specific details described herein, or with other specific details, such as changes with respect to the ordering of the logic, different logic, different architectures, or the like. Thus, the scope of the techniques and/or functions described are not limited by the particular order, selection, or decomposition of aspects described with reference to any particular routine, module, component, or the like.

Example Processes

Figure 4:
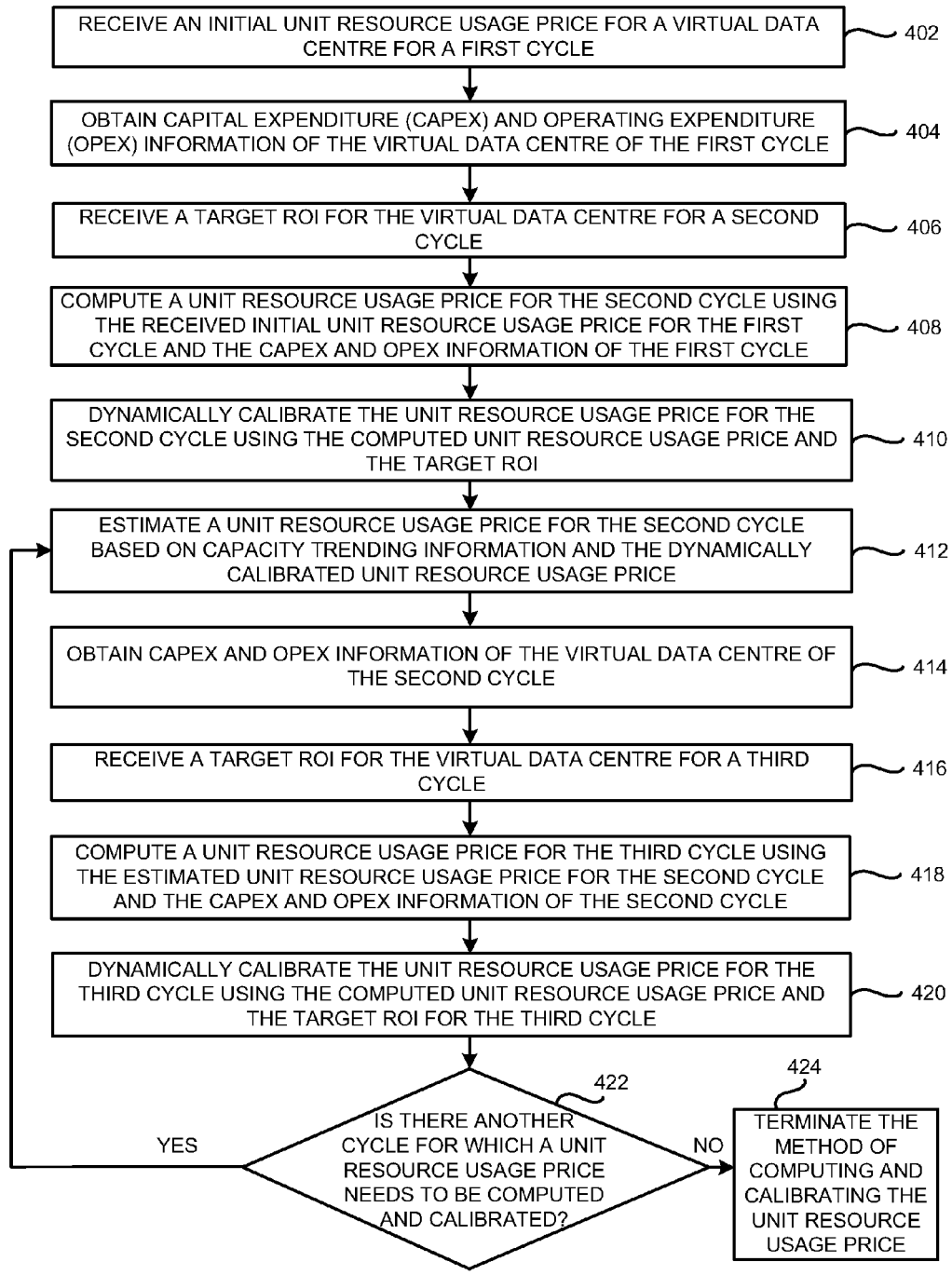
FIG. 4 is a flow diagram of a process for dynamically calibrating a unit resource usage price in a virtual data center, according to an example embodiment.

FIG. 4 is a flow diagram of a process for dynamically calibrating a unit resource usage price in a virtual data center, according to an embodiment. FIG. 4 illustrates a process 400 for dynamically calibrating the unit resource usage price in the virtual data center that may be performed by, for example, one or more modules of a VMS described above. Illustrated process 400 may be set to dynamically calculate the unit resource usage price to facilitate more accurate prediction of ROI in the virtual data center.

At block 402, process 400 receives an initial unit resource usage price for the virtual data center for a first cycle. At block 404, process 400 obtains CAPEX and OPEX information of the virtual data center of the first cycle. At block 406, process 400 receives a target ROI for the virtual data center for a second cycle. At block 408, process 400 is configured to compute a unit resource usage price for the second cycle using the received initial unit resource usage price for the first cycle and the CAPEX and OPEX information of the first cycle. At block 410, process 400 dynamically calibrates the unit resource usage price for the second cycle using the computed unit resource usage price and the target ROI.

At block 412, a unit resource usage price is estimated for the second cycle based on capacity trending information and the dynamically calibrated unit resource usage price. At block 414, process 400 obtains CAPEX and OPEX information of the virtual data center of the second cycle. At block 416, process 400 receives a target ROI for the virtual data center for a third cycle. At block 418, process 400 computes a unit resource usage price for the third cycle using the estimated unit resource usage price for the second cycle and the CAPEX and OPEX information of the second cycle. In some embodiments, the unit resource usage price is computed based on a target cost, an actual cost and estimated cost. Target cost is obtained by collecting the CAPEX and OPEX information, retrieving details of CIO/service provider's budget and target details from IT via the planning dashboard. Actual cost may be obtained from a chargeback report of previous billing cycle. Estimation cost may be obtained from an external estimation module. Estimated cost may be computed by generating on a fly chargeback report for predicted usage and a predicted/calibrated cost model.

At block 420, process 400 is configured to dynamically calibrate the unit resource usage price for the third cycle using the computed unit resource usage price and the target ROI of the third cycle. In some embodiments, the unit resource usage price is calibrated by configuring a chargeback cost model based on fixed costs and base rates and based on past recovery history. In these embodiments, calibration also considers business needs, profitability, and recovery tenure as outlined in the below equation:

$$\text{New Costing Model} = \tau * \text{Old Costing Model} + (1-\tau) * \text{calibrated costs} + \delta$$

wherein $\tau$=History weightage or importance and $\delta$=Factor to incorporate Business Needs, recovery, profitability, etc.

At block 422, process 400 determines whether there is another cycle for which a unit resource usage price has to be computed and calibrated. Based on the determination at block 422, if there is another cycle for which the unit resource usage price has to be computed and calibrated, then the process 400 repeats steps outlined in blocks 412-420. At block 424, if there is no next cycle for which the unit resource usage price has to be computed and calibrated, then the process 400 terminates and ends the computation and calibration of the unit resource usage price in the virtual data center. The process of computing and calibrating the unit resource usage price is explained in more detail with reference to FIGS. 1-3.

Example Computing System Implementation

Figure 5:
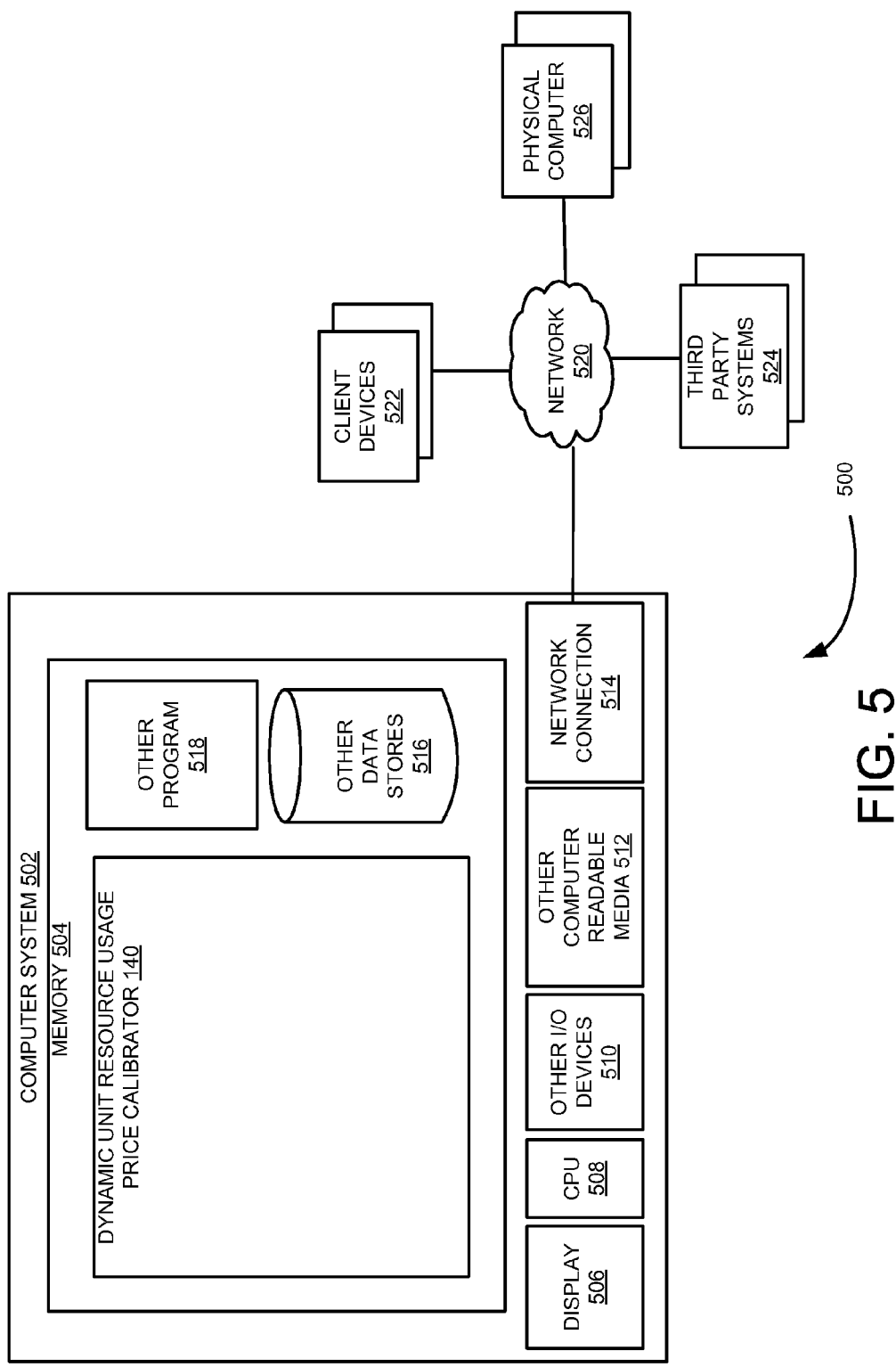
FIG. 5 is a block diagram of a computing system for implementing the dynamic unit resource usage price calibrator in the virtual data center, according to an example embodiment.

FIG. 5 is a block diagram 500 of an example computing system 502 for implementing a dynamic unit resource usage price calibrator in a virtual data center, according to an example embodiment. In particular, FIG. 5 shows computing system 502 that may be utilized to implement dynamic unit resource usage price calibrator 140 shown in FIG. 1.

Note that one or more general purpose virtual or physical computer systems suitably instructed may be used to implement dynamic unit resource usage price calibrator 140. In addition, computing system 502 may comprise one or more distinct computer systems/devices and may span distributed locations. Furthermore, each block shown may represent one or more such blocks as appropriate to a specific embodiment or may be combined with other blocks. Also, dynamic unit resource usage price calibrator 140 may be implemented in software, hardware, firmware, or in some combination to achieve the capabilities described herein.

In the embodiment shown, computing system 502 may comprise computer memory ("memory") 504, display 506, one or more Central Processing Units ("CPU") 508, Input/output devices 510 (e.g., keyboard, mouse, etc.), other computer-readable media 512, and network connections 514. Dynamic unit resource usage price calibrator 140 is shown residing in memory 504. The components of dynamic unit resource usage price calibrator 140 may execute on one or more CPUs 508 and implement techniques described herein. Other code or programs 518 (e.g., an administrative interface, a Web server, and the like) and potentially other data repositories, such as data store 516, may also reside in memory 504, and execute on one or more CPUs 508. One or more of the components in FIG. 5 may not be present in any specific implementation. For example, some embodiments may not provide other computer readable media 512 or display 506.

Dynamic unit resource usage price calibrator 140 interacts via network 520 with client devices 522, physical computers 526, and/or third-party systems/applications 524. Network 520 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication to and from remotely situated humans and/or devices. Third-party systems/applications 524 may include any systems that provide data to, or utilize data from, dynamic unit resource usage price calibrator 140, including remote management/monitoring consoles, performance profilers, activity trackers, or the like.

As discussed, dynamic unit resource usage price calibrator 140 computes and calibrates unit resource usage price for each billing cycle to achieve a predictable and desirable target ROI.

The architecture shown in FIG. 5 may in some embodiments be partially or fully virtualized. For example, computer system 502 may be one or possibly many VMs executing on physical hardware and managed by a hypervisor, virtual machine monitor, or similar technology.

In an example embodiment, components/modules of dynamic unit resource usage price calibrator 140 are implemented using standard programming techniques. For example, dynamic unit resource usage price calibrator 140 may be implemented as a "native" executable running on CPU 508, along with one or more static or dynamic libraries. In other embodiments, dynamic unit resource usage price calibrator 140 may be implemented as instructions processed by a virtual machine (VM) that executes as one of other programs 518.

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of dynamic unit resource usage price calibrator 140, such as in data store 516, can be available by standard mechanisms such as through C, C++, C#, and Java APIs; libraries for accessing files, databases, or other data repositories; through scripting languages such as XML; or through Web servers, FTP servers, or other types of servers providing access to stored data. Data store 516 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, WebSockets, RPC, RMI, HTTP, web services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of dynamic unit resource usage price calibrator 140 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Further, from the foregoing it will be appreciated that, although specific embodiments have been described herein for purposes of illustration, various modifications may be made without deviating from the spirit and scope of this disclosure. For example, the methods, techniques, and systems for dynamic unit resource usage price calibrator are applicable to other architectures or in other settings. For example, the described techniques may be employed as part of a cloud-based computing resource offering, wherein customers may pay to have higher importance levels associated with their activities, in order to obtain higher levels of service or availability. As another example, the described techniques may be employed to manage dynamic unit resource usage price calibration at the process level within an operating system. Also, the methods, techniques, and systems discussed herein are applicable to differing protocols, communication media (optical, wireless, cable, etc.) and devices (e.g., desktop computers, wireless handsets, electronic organizers, personal digital assistants, tablet computers, portable email machines, game machines, pagers, navigation devices, etc.).

The invention claimed is:

1. A method of dynamically calibrating a unit resource usage price in a virtual data center, the method comprising:
    receiving an initial unit resource usage price for the virtual data center for a first cycle;
    obtaining capital expenditure (CAPEX) and operating expenditure (OPEX) information of the virtual data center of the first cycle;
    receiving a target return on investment (ROI) for the virtual data center for a second cycle;
    computing a unit resource usage price for the second cycle using the received initial unit resource usage price for the first cycle and the CAPEX and OPEX information of the first cycle; and
    dynamically calibrating the unit resource usage price for the second cycle using the computed unit resource usage price and the target ROI.

2. The method of claim 1, further comprising:
    estimating a unit resource usage price for the second cycle based on capacity trending information and the dynamically calibrated unit resource usage price;
    obtaining CAPEX and OPEX information of the virtual data center of the second cycle;
    receiving a target ROI for the virtual data center for a third cycle;
    computing a unit resource usage price for the third cycle using the estimated unit resource usage price for the second cycle and the CAPEX and OPEX information of the second cycle; and
    dynamically calibrating the unit resource usage price for the third cycle using the computed unit resource usage price and the target ROI for the third cycle.

3. The method of claim 2, further comprising:
    repeating the steps of claim 2 for each of next subsequent cycles.

4. The method of claim 1, wherein the unit resource usage price is cost per virtual machine (VM) usage per unit time in the virtual data center.

5. The method of claim 1, wherein the resource is selected from the group consisting of a random access memory (RAM), a central processing unit (CPU), a storage disk, and a network.

6. The method of claim 1, wherein the first cycle, the second cycle and the third cycle comprise a first billing cycle, a second billing cycle and a third billing cycle, a first month, a second month and a third month, or a prior cycle, current cycle and a next cycle.

7. The method of claim 1, wherein the target ROI is based on business needs, profitability, and historical ROI.

8. The method of claim 1, wherein the initial unit resource usage price is based on a type of depreciation rate used for the resource in the virtual data center or historical unit resource usage price data.

9. A computer-readable storage medium including instructions that are configured, when executed by a computing system, to perform a method for dynamically calibrating a unit resource usage price in a virtual data center, the method comprising:
    receiving an initial unit resource usage price for the virtual data center for a first cycle;
    obtaining capital expenditure (CAPEX) and operating expenditure (OPEX) information of the virtual data center of the first cycle;
    receiving a target return on investment (ROI) for the virtual data center for a second cycle;
    computing a unit resource usage price for the second cycle using the received initial unit resource usage price of the first cycle and the CAPEX and OPEX; and
    dynamically calibrating the unit resource usage price for the second cycle using the computed unit resource usage price and the target ROI.

10. The computer-readable storage medium of claim 9, further comprising:
    estimating unit resource usage price for the second cycle based on capacity trending and the dynamically calibrated unit resource usage price;
    obtaining CAPEX and OPEX information of the virtual data center of the second cycle;
    receiving a target ROI for the virtual data center for a third cycle;
    computing unit resource usage price for the third cycle using the estimated unit resource usage price of the second cycle and the CAPEX and OPEX of the second cycle; and
    dynamically calibrating the unit resource usage price for the third cycle using the computed unit resource usage price and the target ROI of the second cycle.

11. The computer-readable storage medium of claim 10, further comprising:
    repeating the steps of claim 2 for each of next subsequent cycles.

12. The computer-readable storage medium of claim 9, wherein the unit resource usage price is cost per VM usage per unit time in the virtual data center.

13. The computer-readable storage medium of claim 9, wherein the resource is selected from the group consisting of random access memory (RAM), central processing unit (CPU), storage disk, and network.

14. The computer-readable storage medium of claim 9, wherein the first cycle, second cycle and the third cycle comprises a first billing cycle, second billing cycle and a third billing cycle, a first month, a second month and a third month, or a prior cycle, current cycle and a next cycle.

15. The computer-readable storage medium of claim 9, wherein the target ROI is based on business needs, profitability, and historical ROI.

16. The computer-readable storage medium of claim 9, wherein the initial unit resource usage price is based on type of depreciation rate used for the resource in the virtual data center or historical unit resource usage price data.

17. A virtual data center, comprising:
    host computing systems, wherein each host computing system hosting multiple virtual machines (VMs); and
    a management server, comprising:
        virtualization management software (VMS), including a dynamic unit resource usage price calibrator, wherein the dynamic unit resource usage price calibrator includes a computation engine, a calibrator, and an estimation module that are configured to perform dynamic unit resource usage price calibration in the virtual data center, by:
            receiving an initial unit resource usage price for the virtual data center for a first cycle from a cost data collector by the computation engine;
            obtaining capital expenditure (CAPEX) and operating expenditure (OPEX) information of the virtual data center of the first cycle from the cost data collector by the computation engine;
            receiving a target return on investment (ROI) for the virtual data center for a second cycle from a budget-ROI planner by the calibrator;
            computing a unit resource usage price for the second cycle using the received initial unit resource usage price of the first cycle and the CAPEX and OPEX by the computation engine; and
            dynamically calibrating the unit resource usage price for the second cycle using the computed unit resource usage price and the target ROI by the calibrator.

18. The virtual data center of claim 17, further configured to perform:
    estimating unit resource usage price for the second cycle based on capacity trending information and the dynamically calibrated unit resource usage price by the estimation module;
    obtaining CAPEX and OPEX information of the virtual data center of the second cycle from the cost data collector by the computation engine;
    receiving a target ROI for the virtual data center for a third cycle by the calibrator;
    computing unit resource usage price for the third cycle using the estimated unit resource usage price of the second cycle received from the estimation module and the CAPEX and OPEX of the second cycle from the cost data collector by the computation engine; and
    dynamically calibrating the unit resource usage price for the third cycle using the computed unit resource usage price and the target ROI of the second cycle.

19. The virtual data center of claim 17, further configured to perform:
    repeating the steps of claim 2 for each of next subsequent cycles.

20. The virtual data center of claim 17, wherein the unit resource usage price is cost per VM usage per unit time in the virtual data center.

21. The virtual data center of claim 17, wherein the resource is selected from the group consisting of random access memory (RAM), central processing unit (CPU), storage disk, and network.

22. The virtual data center of claim 17, wherein the first cycle, second cycle and the third cycle comprises a first billing cycle, second billing cycle and a third billing cycle, a first month, a second month and a third month, or a prior cycle, current cycle and a next cycle.

23. The virtual data center of claim 17, wherein the target ROI is based on business needs, profitability, and historical ROI.

24. The virtual data center of claim 17, wherein the initial unit resource usage price is based on type of depreciation rate used for the resource in the virtual data center or historical unit resource usage price data.

* * * * *